(12) United States Patent
Wuerz-Wessel

(10) Patent No.: US 9,030,558 B2
(45) Date of Patent: May 12, 2015

(54) IMAGE PROCESSING METHOD FOR A DRIVER ASSISTANCE SYSTEM OF A MOTOR VEHICLE FOR DETECTING AND CLASSIFYING AT LEAST ONE PORTION OF AT LEAST ONE PREDEFINED IMAGE ELEMENT

(75) Inventor: Alexander Wuerz-Wessel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 579 days.

(21) Appl. No.: 13/380,764

(22) PCT Filed: Jun. 21, 2010

(86) PCT No.: PCT/EP2010/058688
§ 371 (c)(1),
(2), (4) Date: Mar. 15, 2012

(87) PCT Pub. No.: WO2011/000726
PCT Pub. Date: Jan. 6, 2011

(65) Prior Publication Data
US 2012/0162429 A1 Jun. 28, 2012

(30) Foreign Application Priority Data
Jun. 29, 2009 (DE) .......................... 10 2009 027 275

(51) Int. Cl.
*H04N 7/18* (2006.01)
*G06K 9/00* (2006.01)
*G06K 9/62* (2006.01)

(52) U.S. Cl.
CPC .......... *G06K 9/00818* (2013.01); *G06K 9/6228* (2013.01)

(58) Field of Classification Search
USPC .......................................................... 348/148
See application file for complete search history.

(56) References Cited

U.S. PATENT DOCUMENTS 6,556,692 B1 * 4/2003 Gavrila .......................... 382/104
6,711,293 B1 3/2004 Lowe
(Continued)

FOREIGN PATENT DOCUMENTS

DE 198 42 176 3/2000
DE 103 38 455 4/2005
(Continued)

OTHER PUBLICATIONS

International Search Report for PCT/EP2010/058688, dated Nov. 12, 2010.
(Continued)

*Primary Examiner* — Tracy Li
(74) *Attorney, Agent, or Firm* — Kenyon & Kenyon LLP

(57) ABSTRACT

In an image processing method for a driver assistance system for detecting and classifying a portion of a predefined image element having a road sign in a digital image captured by an image sensor of the driver assistance system, first scale-invariant image features and their relative geometric arrangement with respect to one another are computed based on at least one image region of the digital image to be searched, after which a classifier compares the first scale-invariant image features and their relative geometric arrangement with respect to one another to stored and/or learned second scale-invariant image features and their relative geometric arrangement with respect to one another which are computed based on the at least one predefined image element.

1 Claim, 2 Drawing Sheets

(56) References Cited

U.S. PATENT DOCUMENTS

| | | | |
|---|---|---|---|
| 6,801,638 B1* | 10/2004 | Janssen et al. | 382/104 |
| 2007/0292011 A1* | 12/2007 | Nishimura et al. | 382/128 |
| 2008/0247651 A1* | 10/2008 | Takaki et al. | 382/219 |
| 2009/0074249 A1* | 3/2009 | Moed et al. | 382/104 |
| 2009/0313239 A1* | 12/2009 | Wen et al. | 707/5 |

FOREIGN PATENT DOCUMENTS

| | | |
|---|---|---|
| DE | 10 2008 000 758 | 2/2009 |
| EP | 2 214 122 | 8/2010 |
| JP | 2006-235752 | 9/2006 |
| JP | 2008-59319 | 3/2008 |
| JP | 2008-257649 | 10/2008 |
| JP | 2009-43186 | 2/2009 |

OTHER PUBLICATIONS

Herbert Bay, Andreas Ess, Tinne Tuytelaars, Luc Van Gool, "SURF: Speeded-up robust features," Computer Vision and Image Understanding (CVIU), vol. 110, No. 3, pp. 346-359, 2008.

Berthold K. P. Horn, "Closed-form solution of absolute orientation using unit quaternions," Journal of the Optical Society of America A, vol. 4, pp. 629-642, Apr. 1987.

David G. Lowe: "Distinctive Image Features from Scale-Invariant Keypoints," International Journal of Computer Vision, Kluwer Academic Publishers,,, vol. 60, No. 2, Nov. 1, 2004, pp. 91-110.

Merve Can Kus et al.: "Traffic sign recognition using Scale Invariant Feature Transform and color classification," Computer and Information Sciences, 2008, Oct. 27, 2008, pp. 1-6.

Höferlin, B. et al.: "Towards reliable traffic sign recognition," Intelligent Vehicles Symposium, 2009 IEEE, Jun. 3, 2009, pp. 324-329.

Höferlin, Benjamin; Heidemann Gunther: "Selection of an Optimal Set of Discriminative and Robust Local Features with Application to Traffic Sign Recognition," 18th International Conference on Computer Graphics, Visualization and Computer Vision '2010, Feb. 1, 2010.

Höferlin, Benjamin: "Vekehrszeichenerkennung" Diplomarbeit an der Universitäte Stuttgard, Deutschland, May 2008, XP7915250 Retrieved from the Internet: URL:http://www.vis,uni-stuttgart.de/{hoefe rbn/Hoeferlin2008.pdf [retrieved on Oct. 5, 2010].

Farag, Aly A.; Abdel-Hakim, Alaa E.: "Detection, Categorization and Recognition of Road Signs for Autonomous Navigation" Proceedings of ACIVS 2004, Aug. 31, 2004.

Andrea Vedaldi et al.: "Viewpoint Induced Deformation Statistics and the Design of Viewpoint Invariant Features: Singularities and Occlusions," Jan. 1, 2006, p. 1.

Joly, Alexis; Buisson, Olivier: "Discriminant Local Feature Selection using Efficient Density Estimation in a Large Database" Proceedings of the 7th ACM SIGMM International Workshop on Multimedia Information Retrieval, Nov. 10, 2005.

Lepetit, Vincent; Lagger, Pascal; Fua, Pascal: "Randomized Trees for Real-Time Keypoint Recognition," Proceedings of the Computer Vision and Pattern Recognition, Jun. 20, 2005.

Sho Shimamura et al., "Road Sign Recognition with Color and Edge based features", Institute of Electronics, Information and Communications Engineers, Mar. 2009, vol. 108, No. 471pp. 23-28 (with English abstract).

* cited by examiner

IMAGE PROCESSING METHOD FOR A DRIVER ASSISTANCE SYSTEM OF A MOTOR VEHICLE FOR DETECTING AND CLASSIFYING AT LEAST ONE PORTION OF AT LEAST ONE PREDEFINED IMAGE ELEMENT

BACKGROUND OF THE INVENTION

1. Field of the Invention

The present invention relates to an image processing method and a device for a driver assistance system of a motor vehicle for detecting and classifying at least one portion of at least one predefined image element, having a road sign or portions of a road sign in at least one digital image which is to be searched and which is captured by an image sensor of the driver assistance system.

2. Description of Related Art

A method is known from published German patent application document DE 198 42 176 A1 for recognizing road signs in the surroundings of a vehicle and for navigating the vehicle, in which road sign recognition data are generated when a road sign is recognized.

Unlike in countries which have joined the Vienna Convention, in particular for regulating the design of road signs, in countries such as the United States, for example, road signs may be very different and have different shapes. In addition, in the United States the individual states have the responsibility for the design of road signs, as the result of which variations with respect to size, style of writing, configuration, etc., may occur. Furthermore, instead of pictograms as used under the Vienna Convention, text such as "SPEED LIMIT," "TRUCKS," "MINIMUM SPEED," or the like is used. This represents a particular challenge for a driver assistance system based on the recognition of road signs.

In countries in which the road signs are designed in accordance with the Vienna Convention, the driver assistance system is typically able to initially detect the shape, for example a circle for speed limits, in an image which is captured in particular by an image sensor of the driver assistance system. This is likewise possible for U.S. road signs (for example, a rectangular sign). The image details are subsequently normalized with respect to their brightness in order to minimize influences of the lighting situation. In addition, the image details are normalized with respect to their size on the stored pictograms of the road signs to be classified. Lastly, the pictograms are compared by grayscale comparisons with the image details, and when there is an adequate match the image detail is recognized as a road sign. In support, motion information may also be taken into account in order to distinguish, for example, road signs affixed at the rear area of trucks or buses from genuine stationary road signs. The above-described procedure has only limited usability for U.S. road signs in the United States, since the mentioned numerous variations in road signs greatly increase the number of pictograms to be stored, provided that they may even all be found in advance, and thus increase the computing complexity.

An alternative option would be to read, so to speak, the individual characters, i.e., letters and numbers, in the detected road sign, and to interpret them in the sense of optical character recognition (OCR). However, this is relatively complicated and difficult to implement in motor vehicle control units. In addition, the general understanding of the written words is not necessary in principle, since only a limited number of key words are involved.

Methods in image processing have been developed recently which are able to invariantly describe image regions with respect to scaling and rotation. Scale-invariant feature transform (SIFT) is an algorithm for extracting local image features from images, and is used primarily in image recognition. U.S. Pat. No. 6,711,293 B1 discloses a method and a device for identifying scale-invariant features in an image, as well as a method and a device for using such scale-invariant features for locating an object in an image.

Furthermore, an algorithm for quick and robust ascertainment of image features for computer vision is known from Herbert Bay, Andreas Ess, Tinne Tuytelaars, Luc Van Gool, "SURF: Speeded-up robust features," Computer Vision and Image Understanding (CVIU), Vol. 110, No. 3, pp. 346-359, 2008.

With regard to further related art, reference is made to published German patent application document DE 103 38 455 A1.

BRIEF SUMMARY OF THE INVENTION

According to the present invention, an image processing method is proposed for a driver assistance system of a motor vehicle for detecting and classifying at least one portion of at least one predefined image element, having a road sign or portions of a road sign in at least one digital image which is to be searched and which is captured by an image sensor of the driver assistance system; for detecting and classifying the at least one portion of the at least one predefined image element in the at least one digital image to be searched, first scale-invariant image features and their relative geometric arrangement with respect to one another are computed based on at least one image region of the at least one digital image to be searched, after which a classifier compares the first scale-invariant image features and their relative geometric arrangement with respect to one another to stored and/or learned second scale-invariant image features and their relative geometric arrangement with respect to one another which are computed based on the at least one predefined image element, the result of the comparison being that, when there is an adequate match, the at least one portion of the at least one predefined image element in the at least one digital image to be searched is detected and classified.

As a result of the measures according to the present invention, portions of images may be advantageously classified based on scale-invariant image features. Based on the predefined image elements to be searched, which have road signs or portions of road signs such as letters or numbers, the scale-invariant image features per se and their relative geometric position or arrangement with respect to one another are computed in advance and stored or learned by a classifier. A neuronal network, for example, may be used as a classifier. This forms the basis for the classification and/or the search. The scale-invariant image features are likewise computed in the digital image, in particular of the image sensor of the driver assistance system in which the road sign, i.e., its text, numbers, or symbols, are to be found. Since the scale-invariant image features may be uniquely associated with one another, the scale-invariant image features found in the image region may subsequently be compared to the stored or learned scale-invariant image features. Algorithms as described in Berthold K. P. Horn, "Closed-form solution of absolute orientation using unit quaternions," Journal of the Optical Society of America A, Vol. 4, pp. 629-642, April 1987, for example, are suited for this purpose. This may be carried out for multiple image regions. In principle, the entire digital image may be searched or scanned in this way. Optionally, it is also possible to detect and classify only a portion of the road sign, for example when the road sign is partially obstructed by other objects such as bushes and the like. Scalings are advantageously implicitly taken into account. Compared to the known classification methods, the normalization with regard to the size, which is associated with the distance independence of the observed object, as well as to the brightness, may be dispensed with. The computing complexity thus remains relatively low, and the method is advantageously usable on motor vehicle control units. The described image processing method may likewise be used on the numerals of the speed limit, for example "15," "30," "45," "50," and "55." When image elements, for example "SPEED" and "LIMIT" and associated numerals, are detected and classified, a speed limit sign may be categorized as recognized. Because the scale-invariant image features have been developed, among other things, for tracking of the image objects, after a detection the scale-invariant image features may also be directly used for tracking image regions having objects. Compared to conventional methods, the computation of additional features for the tracking is thus advantageously dispensed with. The image processing method according to the present invention is suitable for classifying and detecting image regions having any given geometric arrangements of scale-invariant image features to be found, and is not limited to text or numerals.

It is advantageous when the second scale-invariant image features and their relative geometric arrangement with respect to one another are computed in advance in a training step, based on the at least one predefined image element, using different designs of the at least one predefined image element, in particular having different views or styles of writing of the road sign, and are stored and/or learned by the classifier.

As a result of these measures, the classifier may be presented with different views or specific embodiments, for example, in a training step. All possible scale-invariant image features are computed, and appropriate responses (positive or negative result of the comparison) are predefined. A neuronal network, for example, could be used as a classifier.

According to the present invention, it may also be provided that only characteristic second scale-invariant image features and their relative geometric arrangement with respect to one another which are identified in the training step are taken into account.

The scale-invariant image features for which the same responses are obtained for different views or images are ascertained in the training step. Image features which respond very strongly to multiple views or images in the training step are identified as so-called characteristic or discriminating features, which may then be exclusively taken into account in the image processing method according to the present invention.

It is advantageous when the first scale-invariant image features and the second scale-invariant image features are computed with the aid of the above-mentioned scale-invariant feature transform (SIFT) method or the likewise above-mentioned speeded-up robust features (SURF) method.

According to the present invention, it may also be provided that the at least one image region is identified in advance by searching for certain geometric shapes in the at least one digital image to be searched. The computing complexity may be further reduced by a limitation to image regions which are ascertained, for example, with the aid of a geometric search for certain shapes such as rectangles, circles, or the like. The system speed is likewise increased.

It is advantageous when a measure for the correctness of the detection and classification is determined. In a comparison, for geometric deviations (for example, a different style of writing) a measure may be developed which may be used as a threshold for discarding the classification or detection. The detection and classification may be discarded when the measure for the correctness of the detection and classification is below a predefined threshold value. The number of pixels of the second scale-invariant image features which is associatable with the pixels of the first scale-invariant image features may be used as a measure for the correctness of the detection and classification.

In addition, an intrinsic motion which is ascertained based on sequences of the digital images to be searched may be taken into account. Thus, analyses in the image sequences may likewise be used in a supporting manner.

The at least one predefined image element may have at least one text element of a road sign.

A computer program and a computer program product having program code means for executing the image processing method according to the present invention are stated in the patent claims.

A device, in particular a driver assistance system of a motor vehicle, having at least one image sensor and an image processing device connected thereto is likewise proposed.

The image processing method according to the present invention is preferably implemented as a computer program on an image processing device of a driver assistance system of a motor vehicle, other approaches, of course, also being suitable. For this purpose, the computer program may be stored with the aid of a memory element (for example, ROM, EEPROM, or the like) of the image processing device. The image processing method is executed by processing on the image processing device. The image processing device may have a microcomputer having a microprocessor, a programmable integrated circuit (field-programmable gate array (FPGA)), an application-specific integrated circuit (ASIC), a digital signal processor (DSP), or the like. The image processing device may be provided on a control unit of the driver assistance system. The computer program may be stored on a computer-readable data carrier (diskette, CD, DVD, hard drive, USB memory stick, memory card, or the like) or an Internet server as a computer program product, and from there transferred into the memory element of the image processing device.

DETAILED DESCRIPTION OF THE INVENTION

Figure 1:
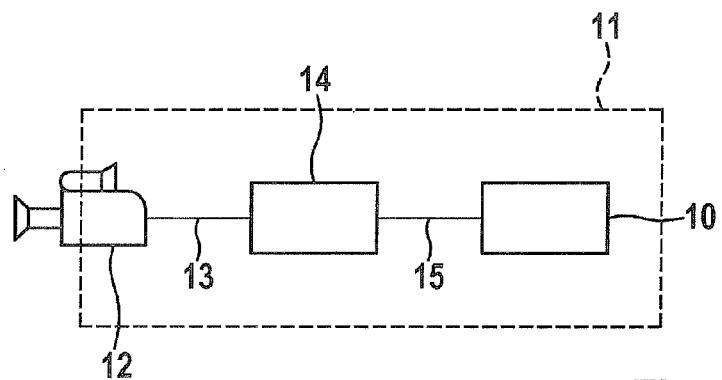
FIG. 1 shows a schematic illustration of a driver assistance system of a motor vehicle.

FIG. 1 shows a driver assistance system 10 of a motor vehicle 11 indicated by dashed lines, and an image sensor 12 which is connected to an evaluation unit, i.e., image processing device 14, via an image sensor signal line 13.

Image processing device 14 is connected to driver assistance system 10 via an output signal line 15. For example, CCD or CMOS cameras, or also thermal imaging devices or the like, are usable as image sensor 12. Additional image sensors 12 may also be provided in other exemplary embodiments (not illustrated), for example to allow generation of stereo images. Image sensor 12 transmits digital images of the observed scene to image processing device 14 via image sensor signal line 13. Image processing device 14 generates an output signal on output signal line 15 which is electrically, digitally, acoustically, and/or visually transmitted to driver assistance system 10 for display, information, or storage.

In the present exemplary embodiment, driver assistance system 10 is a driver information system which recognizes road signs and displays them to the driver. In another exemplary embodiment, driver assistance system 10 could also be designed as an adaptive cruise control device for motor vehicle 11. Such systems are also referred to as adaptive cruise control (ACC) systems. These types of adaptive cruise control devices are described in the Robert Bosch GmbH publication "ACC Adaptive Cruise Control," Yellow Series, 2002 edition, Technical Instruction. For example, the adaptive cruise control devices could regulate the speed of the motor vehicle on the basis of a recognized road sign.

Figure 2:
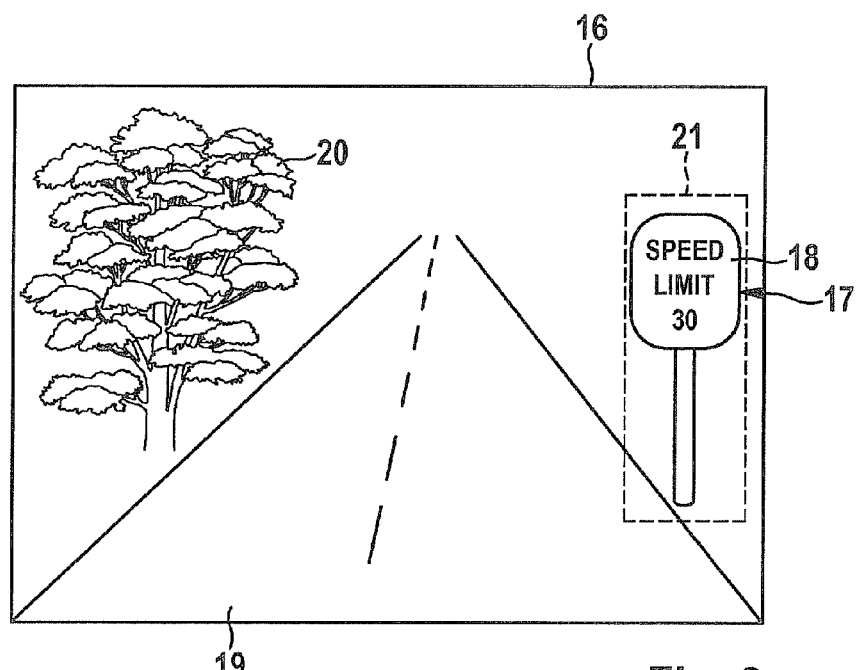
FIG. 2 shows a schematic illustration of a digital image of an image sensor of the driver assistance system for elucidating an image processing method according to the present invention.

FIG. 2 illustrates in simplified form a digital image 16 of image sensor 12 for elucidating an image processing method according to the present invention. The image processing method according to the present invention for driver assistance system 10 of motor vehicle 11 runs on image processing device 14 for detecting and classifying at least one portion of at least one predefined image element 17, having a road sign 18 or portions of road sign 18 in digital image 16 which is to be searched and which is captured by image sensor 12 of driver assistance system 10. A scene having a roadway 19 and a tree 20 is illustrated in digital image 16 in greatly simplified form.

Figure 3:
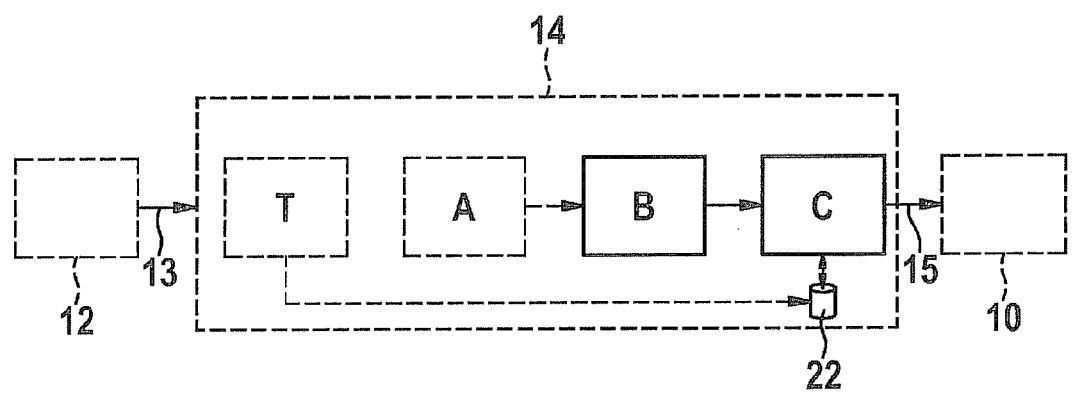
FIG. 3 shows a simplified block diagram of the image processing method according to the present invention.

FIG. 3 illustrates as a block diagram the image processing method according to the present invention which runs on image processing device 14, having additional optional steps indicated by dashed lines. For detecting and classifying predefined image element 17 in digital image 16 to be searched, first scale-invariant image features and their relative geometric arrangement with respect to one another are computed in a method step B, based on one or multiple image regions 21 (see FIG. 2) of digital image 16 to be searched, after which in a method step C a classifier compares the first scale-invariant image features and their relative arrangement with respect to one another to stored or learned second scale-invariant image features and their relative geometric arrangement with respect to one another (indicated in simplified form as a database 22 in FIG. 3) which are computed from predefined image element 17, the result of the comparison from method step C being that when there is an adequate match, the at least one portion of predefined image element 17 in digital image 16 to be searched is detected and classified. This is transmitted to driver assistance system 10 via output signal line 15.

Image region 21 may be identified in a method step A by searching for certain geometric shapes, in the present case a rectangle, of road sign 18 in digital image 16 to be searched.

Figure 4:
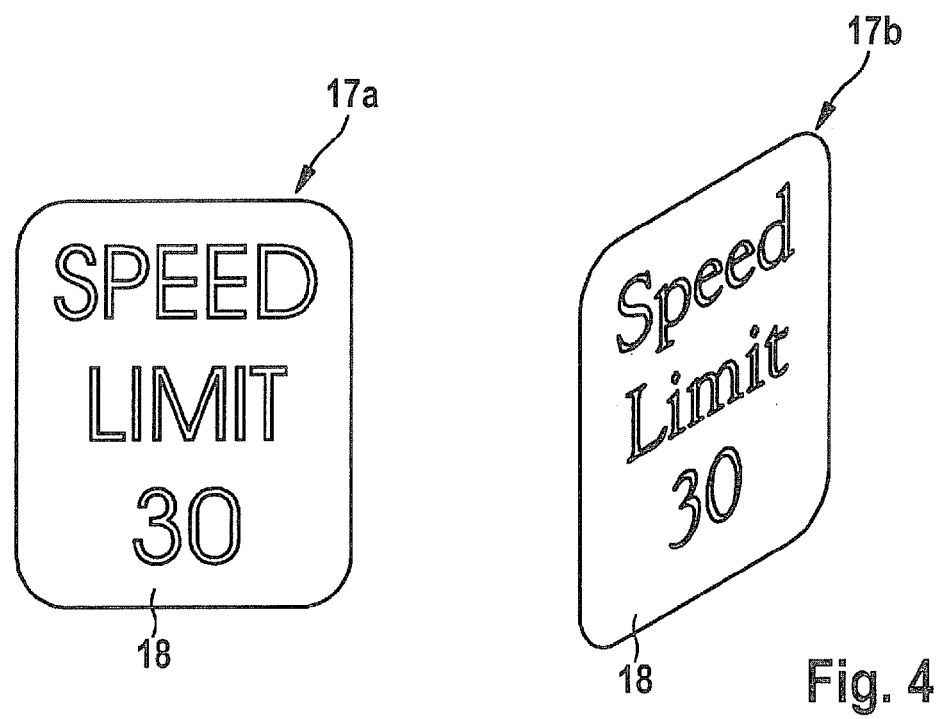
FIG. 4 shows a schematic illustration of different views or specific embodiments of a road sign for elucidating the image processing method according to the present invention.

The second scale-invariant image features and their relative geometric arrangement with respect to one another are computed in a training step T, based on the at least one predefined image element 17, using different specific embodiments 17a, 17b of predefined image element 17, in particular having different views or text elements of road sign 18, illustrated in simplified form in FIG. 4, and are stored and/or learned by the classifier.

Only characteristic second scale-invariant image features and their relative geometric positions with respect to one another are taken into account in the present exemplary embodiment. These are identified in training step T.

The first scale-invariant image features and the second scale-invariant image features may be computed with the aid of the scale-invariant feature transform (SIFT) method or the speeded-up robust features (SURF) method.

A measure for the correctness of the detection and classification is determined. Driver assistance system 10 receives from image processing device 14 via output signal line 15 the result of the detection and classification, and thus, information concerning whether a certain road sign 18 has been recognized in digital image 16.

The detection and classification are discarded if the measure for the correctness of the detection and classification is below a predefined threshold value. The number of pixels of the second scale-invariant image features which is associatable with the pixels of the first scale-invariant image features is used as a measure for the correctness of the detection and classification.

In addition, an intrinsic motion of motor vehicle 11 which is ascertained based on sequences of digital images 16 to be searched is taken into account.

The image processing method according to the present invention is preferably implemented as a computer program on image processing device 14 of motor vehicle 11, other approaches, of course, also being suitable. For this purpose, the computer program may be stored in a memory element (for example, ROM, EEPROM, or the like) of image processing device 14. The image processing method is executed by processing on image processing device 14. Image processing device 14 may have a microcomputer having a microprocessor, a programmable integrated circuit (field-programmable gate array (FPGA)), an application-specific integrated circuit (ASIC), a digital signal processor (DSP), or the like. The computer program may be stored on a computer-readable data carrier (diskette, CD, DVD, hard drive, USB memory stick, memory card, or the like) or an Internet server as a computer program product, and from there transferred into the memory element of image processing device 14.

What is claimed is:

1. An image processing method for a driver assistance system of a motor vehicle for detecting and classifying at least one portion of a predefined image element having a road sign in a selected digital image captured by an image sensor of the driver assistance system, comprising:
    computing first scale-invariant image features and relative geometric arrangement of the first scale-invariant image features with respect to one another based on at least one image region of the digital image;
    comparing, by a classifier unit of the driver assistance system, the first scale-invariant image features and the relative geometric arrangement of the first scale-invariant image features with respect to one another to second scale-invariant image features and relative geometric arrangement of the second scale-invariant image features with respect to one another which are computed based on the predefined image element; and
    determining, by the classifier unit, the at least one portion of the predefined image element of the digital image to be detected and classified if the comparing produces a match,
    wherein a measure for the correctness of the detection and classification is determined, and wherein a number of pixels of the second scale-invariant image features associated with pixels of the first scale invariant image features is used as the measure for the correctness of the detection and classification.

* * * * *